United States Patent [19]

Cutts

[11] Patent Number: 5,697,694
[45] Date of Patent: Dec. 16, 1997

[54] GLOWING ORB CANDLE

[76] Inventor: Creighton Cutts, 718 Shoal Creek Rd., Canton, Ga. 30114

[21] Appl. No.: 589,785

[22] Filed: Jan. 22, 1996

Related U.S. Application Data

[63] Continuation of Ser. No. 181,346, Jan. 14, 1994, Pat. No. 5,492,664.

[51] Int. Cl.$^6$ ........................................................ F21V 35/00
[52] U.S. Cl. ........................... 362/161; 362/182; 362/163; 431/289; 431/291; 431/126
[58] Field of Search ........................ 362/161, 163, 362/182, 159, 806, 162; 431/289, 288, 291, 126; 264/156, 154, 238, 255, 279.1, 301, 303, 305, 314

[56] References Cited

U.S. PATENT DOCUMENTS

| | | | |
|---|---|---|---|
| 976,359 | 11/1910 | Hamel | 264/314 |
| 1,292,195 | 1/1919 | Will | 362/163 |
| 1,709,889 | 4/1929 | Tasker . | |
| 1,831,902 | 11/1931 | Brown | 431/288 |
| 2,328,769 | 9/1943 | Auzin . | |
| 2,584,563 | 2/1952 | Duncan | 431/288 |
| 2,735,285 | 2/1956 | Ferleger . | |
| 3,607,998 | 9/1971 | Goodridge . | |
| 3,890,085 | 6/1975 | Andeweg | 431/125 |
| 3,974,996 | 8/1976 | Violet . | |
| 3,983,677 | 10/1976 | Lundbom . | |
| 4,022,862 | 5/1977 | McBride et al. | 264/271 |
| 4,184,195 | 1/1980 | Duncan | 362/163 |
| 4,894,008 | 1/1990 | Lee | 431/290 |
| 5,078,945 | 1/1992 | Byron | 264/278 |
| 5,178,451 | 1/1993 | Henry | 362/161 |
| 5,213,732 | 5/1993 | Jevtic | 264/71 |
| 5,492,664 | 2/1996 | Cutts | 264/156 |

FOREIGN PATENT DOCUMENTS 851609  10/1960  United Kingdom ............... 431/291

OTHER PUBLICATIONS

The Candle Makers Monthly Periodical, Printed by: Pourette Mfg. Co., Title: The Candle Cauldron, No. 61, Oct. 1971.

Primary Examiner—Thomas M. Sember
Attorney, Agent, or Firm—Jeffrey R. Kuester; Thomas, Kayden, Horstemeyer & Risley LLP

[57] ABSTRACT

A primary outer shell includes, in its most preferred embodiment, a base and a wall which includes at least one embedded foreign object and defines openings into an inner cavity containing a burnable candle member which causes the outer shell to glow and cast shadows without melting. The outer shell is constructed according to a unique molding method which includes at least partially immersing a swollen distensible mold, such as a water-filled balloon, into a reservoir of molding material, such as wax, to allow the molding material to form a molded shell around the distensible mold. After the distensible mold with the attached molded shell is removed from the reservoir of molding material, it is placed upon a flat surface to form a flat bottom into the molded shell. A foreign object is then mounted to the molded shell, and the distensible mold with the attached molded shell is again immersed in the reservoir of molding material to form a second layer of molded material and embed the foreign object into the molded shell. Subsequently, the distensible mold is removed from within the molded shell, such as by popping the balloon and pouring out the water and balloon, to leave an inner cavity, and the outer shell is pierced to form openings into the inner cavity.

19 Claims, 6 Drawing Sheets

GLOWING ORB CANDLE

This application is a continuation of Ser. No. 08/181,346 filed Jan. 14, 1994, now U.S. Pat. No. 5,492,664.

BACKGROUND OF THE INVENTION

The present invention relates generally to the field of molds, and more specifically, to the field of molding candle structures.

The practice of making candles is very old, and candles are now available in a variety of different sizes and shapes ranging from long, slender candlesticks for use in candelabra to short votive candies for use in religious ceremonies, etc. It has also been well known to use a variety of devices to support and accentuate candles. Accordingly, one known practice is to place small candles behind translucent structures such as a decorative stained glass displays. Other practices include placing candles within various types of casings such as luminaria, pumpkins, or other structures such as is disclosed in U.S. Pat. No. 2,735,285. The lantern-shaped structure disclosed in that patent includes a long candle protruding through a closed roof of a casing which is constructed of wax having a higher melting point than the enclosed candle. As the candle burns down to the lantern-shaped casing, a hole is melted into the roof where it contacts the flame to enable the candle to continue burning within the casing to illuminate the casing. Unfortunately, that hole will likely appear irregular and look as though something has broken off so that the casing is not truly reusable in the sense that it will look much different after the first use.

There are many methods of forming candles. One older method includes repeatedly dipping a burnable wick into a reservoir of molten wax. Others include suspending a wick within a mold cavity of an external mold while introducing molten wax into the external mold. After the wax hardens into a candle, methods for removing the candle from the external mold include tearing disposable molds away from the candle, opening multi-piece molds to remove the candle, and distending expansible external molds as disclosed in U.S. Pat. No. 4,022,862. Unfortunately, none of these techniques appear to provide an easy, efficient, and cost-effective method for molding a shell such as a casing for enclosing a burnable candle member.

There is, therefore, a need in the industry for an apparatus and a method which address these and other related, and unrelated, problems.

SUMMARY OF THE INVENTION

Briefly described, the present invention includes, in its most preferred embodiment, a glowing orb candle which includes an outer shell with a flat bottom wall and a continuous spherical side wall extending upward from the bottom wall to define an inner cavity in which is located an inner candle member with a burnable wick mounted upon the flat bottom wall of the outer shell below a formed upper aperture in the outer shell. At least one foreign object is embedded within the side wall to cast shadows outside the glowing orb candle, and a plurality of small apertures are defined in the side wall located down from the upper aperture to emit light from within the inner cavity. The outer shell is particularly shaped and sized relative to the inner candle member so that when the inner candle member burns, the outer shell glows without melting even though the inner candle member and the outer shell are both constructed of a wax material having a similar melting point.

The preferred embodiment of the present invention also includes a unique method of molding a shell such as the outer shell of the glowing orb candle. Such a method includes at least partially immersing a swollen distensible mold into a reservoir of molding material to allow the molding material to form an outer shell around the outside of the mold. In one example of the preferred embodiment of the present invention, the swollen distensible mold is an ordinary water-filled balloon, and the molding material is molten wax. With respect to this example, after a wax outer shell forms around the water-filled balloon, the water-filled balloon with the attached wax outer shell is eventually removed from the reservoir of molten wax and placed upon a flat surface to form a flat bottom into the outer shell as it dries.

A foreign object, such as a leaf, flower, or written material is then mounted to the outer shell, and the water-filled balloon with the attached outer shell is again immersed in the reservoir of molten wax to form a second layer of the outer shell which extends around the foreign object so that the foreign object is visible (and legible in the case of written material) through the outer layer. After the outer shell dries again, the balloon is opened, such as through popping, and the water and balloon are poured out of the outer shell to leave a vacant inner cavity. Then, a hot instrument is used to pierce the side wall of the outer shell to form the plurality of small light-emitting apertures. The present invention also includes a variety of alternate embodiments, each of which is discussed in detail below.

It is therefore an object of the present invention to provide a glowing candle structure.

Another object of the present invention is to provide a candle which includes a reusable outer shell and an inner member having a burnable wick.

Another object of the present invention is to provide a candle which includes an outer shell and an inner member which are both constructed of wax having a similar melting point.

Yet another object of the present invention is to provide a candle which includes a wax outer shell defining an inner cavity accessible through a formed upper aperture and visible through a plurality of small lower apertures.

Yet another object of the present invention is to provide a candle which includes an outer shell which includes an inner layer and an outer layer and a foreign object embedded between the inner layer and the outer layer.

Still another object of the present invention is to provide a method for molding a shell which includes the step of immersing an expanded distensible mold at least partially within a reservoir of molding material.

Still another object of the present invention is to provide a method for molding a shell which includes the step of immersing an expanded, reusable distensible mold at least partially within a reservoir of molding material.

Still another object of the present invention is to provide a method for molding a shell which includes repeatedly immersing an expanded distensible mold at least partially within a reservoir of molding material to embed a foreign object between layers of the shell.

Other objects, features and advantages of the present invention will become apparent upon reading and understanding the present specification, when taken in conjunction with the accompanying drawings.

DETAILED DESCRIPTION OF THE PREFERRED EMBODIMENT

Figure 1:
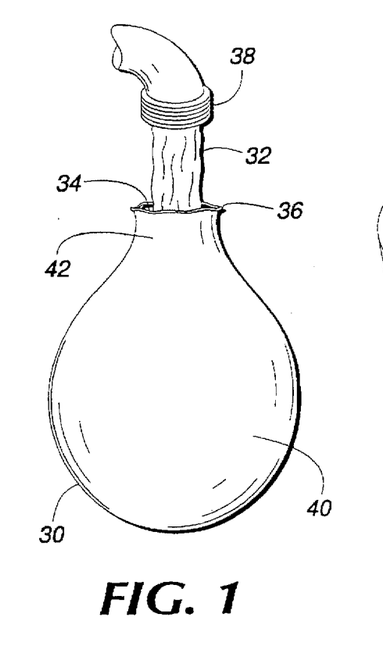
FIG. 1 is a side view representation of a first step of the preferred method of constructing a glowing orb candle which includes expanding a distensible mold by introducing distensing fluid into the mold.

Referring now in greater detail to the drawings in which like numerals represent like components throughout the several views, FIG. 1 shows a side view representation of a first step of the preferred method of the present invention which includes expanding a distensible mold 30 by introducing distensing fluid 32 into an expandable cavity 34 defined within the distensible mold 30. According to one acceptable example of the preferred method of the present invention, the distensible mold 30 is an ordinary round balloon and the distensing fluid 32 is a liquid such as ordinary water. The distensible mold 30 is shown including a mold lip 36 which can be positioned around a faucet lip 38 during filling of the distensible mold 30. A mold exterior surface 40 is also shown located below a mold neck 42.

Figure 2:
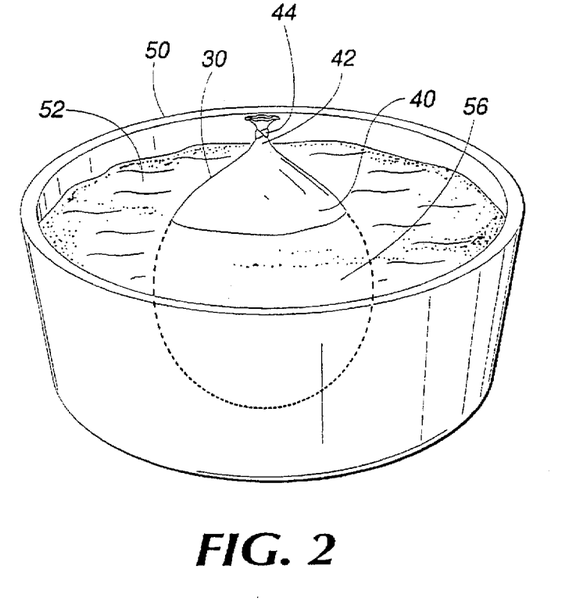
FIG. 2 is a side view representation of a subsequent step of the preferred method which includes partially submerging the swollen distensible mold into a reservoir of molding material.
Figure 3:
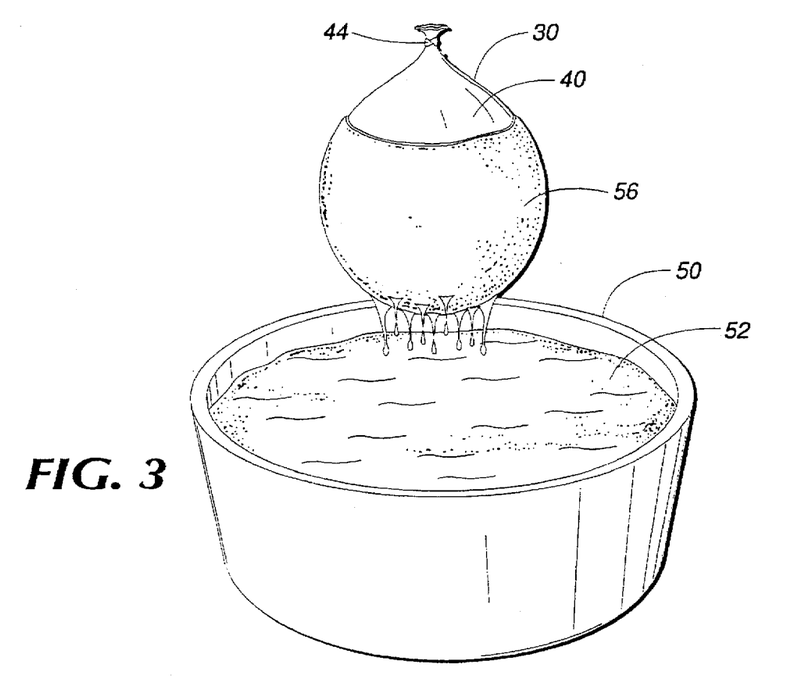
FIG. 3 is a side view representation of another subsequent step of the preferred method which includes removing the distensible mold with a shell of molding material formed around the distensible mold.
Figure 4:
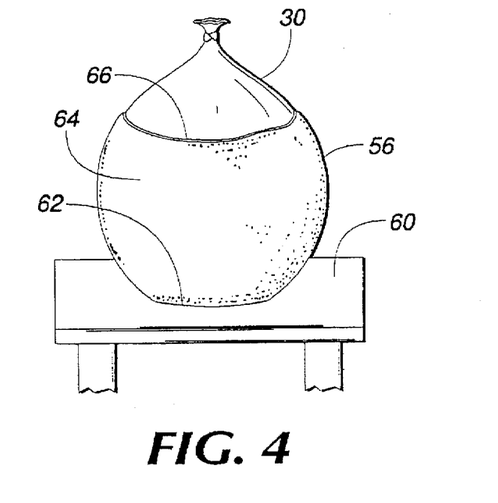
FIG. 4 is a side view representation of another subsequent step of the preferred method which includes placing the mold with attached shell upon a flat surface to solidify.

Referring now to FIG. 2, after the distensible mold 30 has been expanded, the mold neck 42 is tied into a neck knot 44 which seals the distensible mold 30 and provides a place to easily grasp the distensible mold 30. The expanded distensible mold 30 is then partially submerged into a reservoir 50 of molding material 52. According to one acceptable example of the preferred method of the present invention, the molding material 52 is molten beeswax having a temperature of approximately 155° F. The distensible mold 30 is allowed to remain within the reservoir 50 until the molding material 52 forms a primary shell 56 around the mold exterior surface 40. With reference to FIG. 3, as the distensible mold 30 is removed from the reservoir 50, the primary shell 56 is shown attached around the mold exterior surface 40. The distensible mold 30 with attached primary shell 56 is then placed, as shown in FIG. 4, upon a flat surface 60 and allowed to solidify. Because of the weight of the distensing liquid 32 (FIG. 1) within the distensible mold 30, a flat shell bottom wall 62 is formed. A continuous shell side wall 64 extends substantially spherically upward from the shell bottom wall 62 until terminating at a shell top edge 66.

Figure 5:
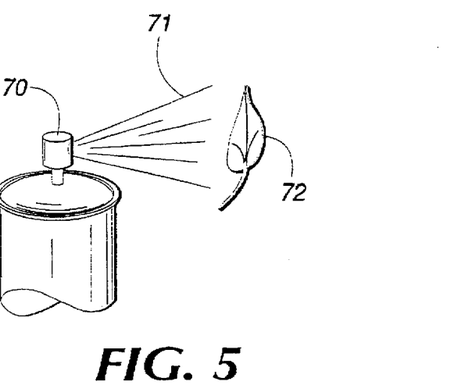
FIG. 5 is a side view representation of another subsequent step of the preferred method which includes applying adhesive to one side of a foreign object for being affixed to the shell of molding material.
Figure 6:
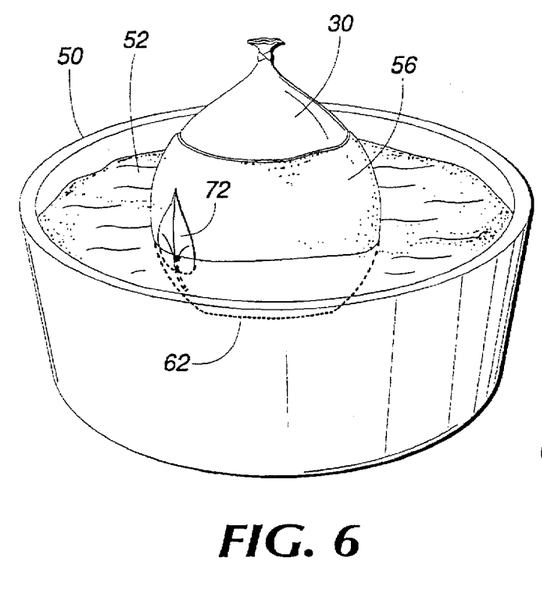
FIG. 6 is a side view representation of another subsequent step of the preferred method which includes submerging the mold with attached shell and foreign object into the reservoir of molding material.
Figure 7:
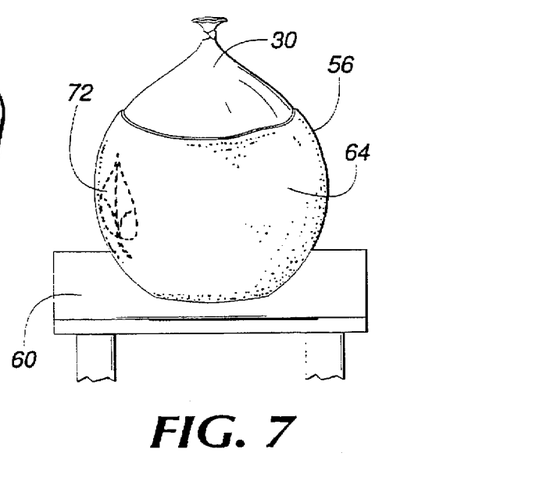
FIG. 7 is a side view representation of another subsequent step of the preferred method which includes placing the mold with attached shell and embedded foreign object onto a flat surface.

In a subsequent step, a foreign object, such as a leaf 72 as shown in FIG. 5, receives an adhesive 71 from an adhesive container 70. One example of an acceptable adhesive is the 3M Super 77™ spray adhesive available from 3M of St. Paul, Minn. Another acceptable example includes a diluted mixture of ordinary honey and water. The leaf 72 is then mounted onto the shell side wall 64 before the distensible mold 30 with attached primary shell 56 is partially submerged within the reservoir 50 to embed the leaf 72 within the primary shell 56 by adding another layer of molding material 52 to the primary shell 56. Subsequently, the distensible mold 30 with attached primary shell 56 is again removed from the reservoir 50 and allowed to solidify upon the flat surface 60 as shown in FIG. 7.

Figure 8:
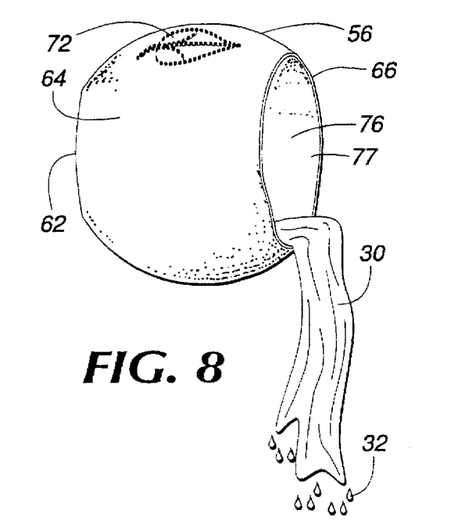
FIG. 8 is a side view representation of another subsequent step of the preferred method which includes removing the distensing fluid and distensible mold from the molded shell.
Figure 9:
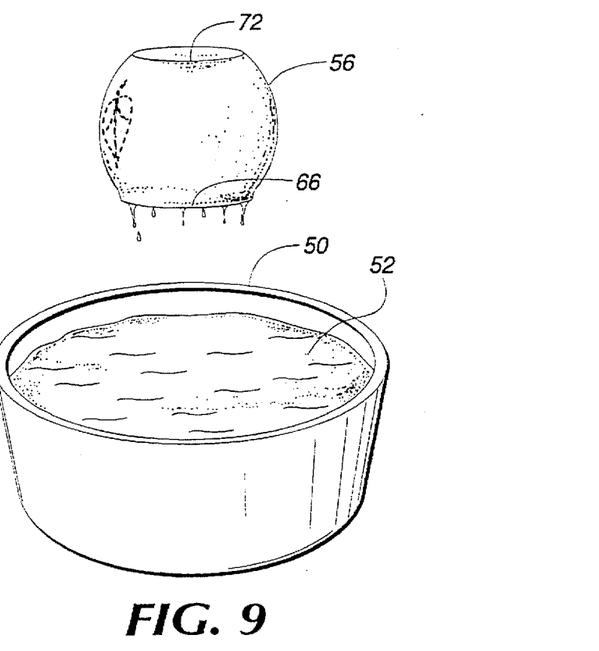
FIG. 9 is a side view representation of another subsequent step of the preferred method which includes slightly submerging the top of the molded shell into the reservoir of molding material to create a slightly flared top.
Figure 10:
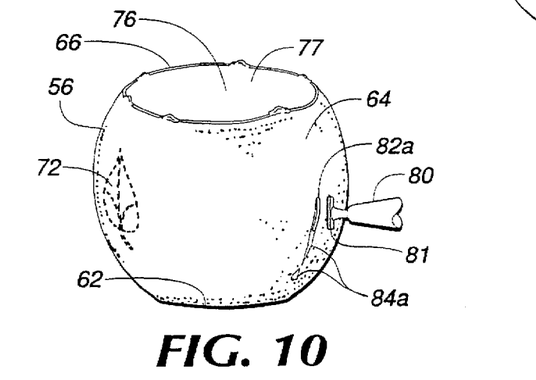
FIGS. 10 and 11 are side view representations of other subsequent steps of the preferred method which include piercing the wall of the molded shell to create a plurality of light apertures.
Figure 11:
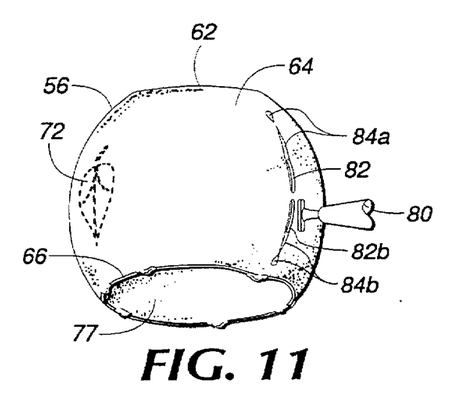
Figure 12:
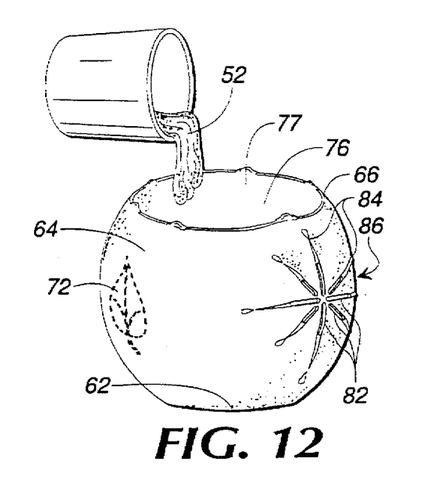
FIG. 12 is a side view representation of another subsequent step of the preferred method which includes pouring a small amount of molding material into the molded shell for receipt of an inner candle member.

Referring now to FIG. 8, after the primary shell 56 has dried and solidified, the distensible mold 30 is popped so that both the distensible mold 30 and the distensing fluid 32 can be easily poured from the primary shell 56. As a result, an inner cavity 76 is left within the primary shell 56. The shell top edge 66 defines an upper aperture 77 providing access into the inner cavity 76. Subsequently, the shell top edge 66 is slightly flared by barely dipping the shell top edge 66 back into the reservoir 50, as is shown in FIG. 9, after which the additional molding material 52 on the shell top edge 66 is allowed to solidify. With reference now to FIG. 10, a heated tool 80 with a heated tool head 81 is inserted into the shell side wall 64 to open an aperture 82a into the inner cavity 76. During that process, the primary shell 56 melts partially so that a dropping 84a streams down the outside of the shell side wall 64 toward the shell bottom wall 62. As shown in FIG. 11, the primary shell 56 is rotated before the piercing step is repeated so that a second dropping 84b streams downward toward the shell top edge 66. This process is repeated throughout various angles to form an aperture dropping pattern 86 as shown in FIG. 12. Subsequently, a portion of molding material 52 is poured through the upper aperture 77 onto the shell bottom wall 62, the purpose of which is explained below.

Figure 13:
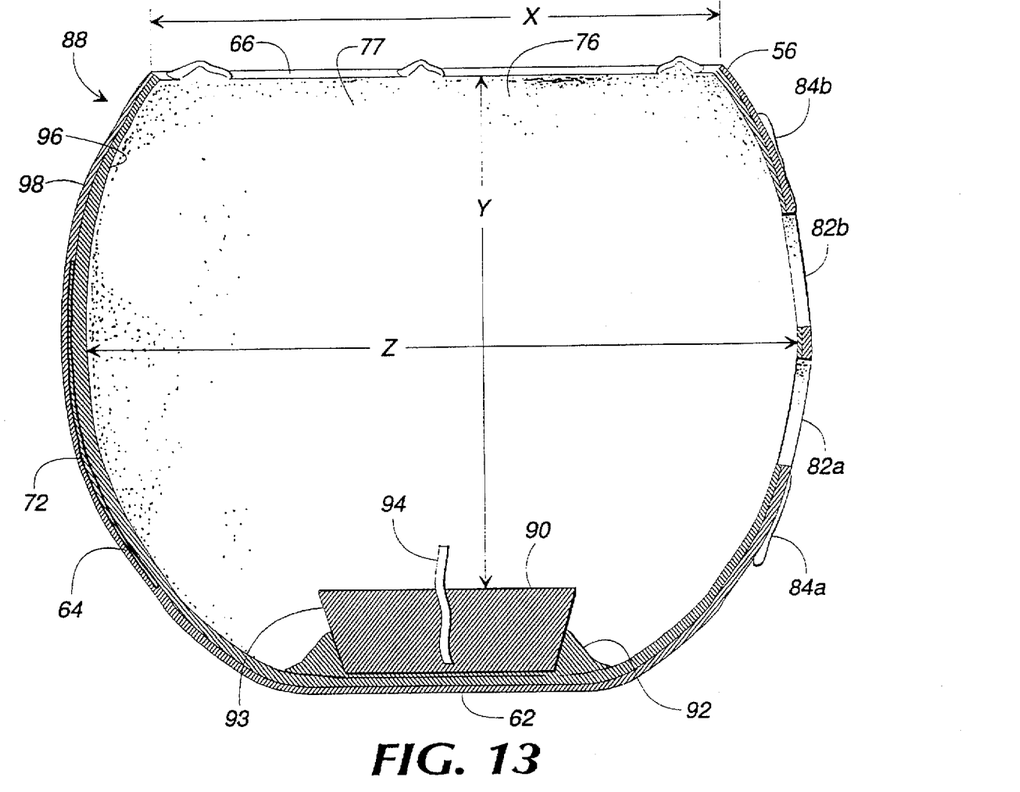
FIG. 13 is a side cross-sectional view of a glowing orb candle in accordance with the preferred embodiment of the present invention.
Figure 14:
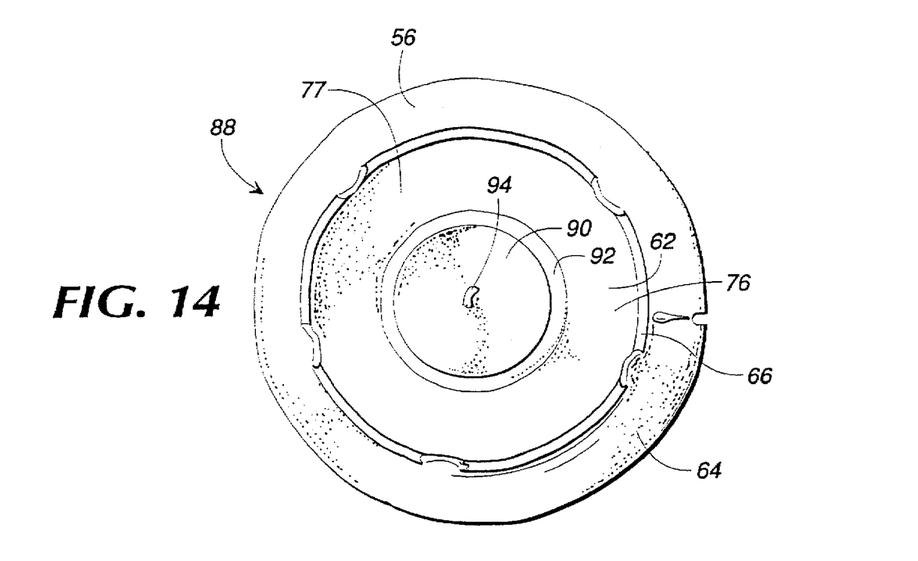
FIG. 14 is a top plan view of the glowing orb candle of FIG. 13.

FIG. 13 shows a side cross-sectional view of the glowing orb candle 88 which includes the previously described primary shell 56 and an inner member 90 mounted upon the shell bottom wall 62 through an inner cup 92. Refer also to FIG. 14 which shows a top plan view of the glowing orb candle 88 of FIG. 13. The inner cup 92 is formed by placing the inner member 90 into the molding material 52 which was poured onto the shell bottom wall 62, as discussed above, before the molding material 52 is allowed to solidify. The inner member 90 includes an inner member melting portion 93 of the same molding material 52 and a burnable wick 94 as shown. Formation of the inner member 52 is accomplished in a conventional way of suspending a wick within an external mold, such as a small paper cup, while introducing molding material 52 into the cup, and allowing the molding material to solidify before pulling the mold away. The primary shell 56 is an outer shell which includes an inner layer 96 and an outer layer 98 which enclose the leaf 72. In addition, the apertures 82a,b are shown extending through both the inner layer 96 and the outer layer 98 into the inner cavity 76, while the droppings 84a,b are shown attached outside the outer layer 98.

The glowing orb candle 88 operates when the wick 94 is lighted. While the wick 94 burns and the molding material 52 of the inner member melting portion 93 begins to melt, light is emitted all around the inside of the shell side wall 64 to cause the primary shell 56 to glow most dramatically. Thus, the glowing orb candle 88 is itself transformed into a visually appealing glowing object. In addition, light is emitted from the glowing orb candle 88 in particular patterns which have been found to be very pleasing. Light from the wick 94 shines straight through the apertures 82 to produce aperture shaped light projections on nearby external walls and surfaces. Besides light projections, the glowing orb candle 88 also casts shadows onto the nearby external walls and surfaces because of, and in the shapes of, the droppings 84 and the leaf 72. Because the droppings 84 extend outward from ends of the apertures 82 which extend outward from the center of a star-shaped pattern, as shown in FIG. 12, the shadows give the illusion of the star rays extending indefinitely.

Furthermore, despite the heat generated by the burning wick 94 and the fact that the primary shell 56 is constructed of the same molding material 52 as the inner member melting portion 93, the primary shell 56 glows without melting. This phenomenon can be attributed to, among other factors, the type of molding material 52 (FIG. 2) forming the primary shell 56, the location of the inner member 90, and the dimensions of the glowing orb candle 88. According to one example of the preferred embodiment of the present invention where the primary shell 56 and inner member melting portion 93 are constructed of beeswax and it is intended that the primary shell 56 glow without melting, the diameter X of the upper aperture 77 is at least 3.5 inches, and preferably 5 inches, the height Y between the shell top edge 66 and the top of a newly formed inner member 90 is at least 2.5 inches, and preferably 5 inches where the newly formed inner member 90 is approximately ¾ of inch tall, and the middle width Z of the primary shell 56 is at least 4.75 inches, and preferably 7 inches. In addition, the substantially spherical shape of the primary shell 56 is felt to be important in dispersing the heat from the burning wick 94 and dispersing a pleasant beeswax aroma while helping to prevent the primary shell 56 from melting. After the wick 94 is exhausted, the inner member 90 may easily be replaced through the upper aperture 77 so that the glowing orb candle 88 is truly reusable in that it will appear identical to its original state. In other alternate embodiments of the present invention, it may be desirable to construct a candle with smaller dimensions to purposely melt away the primary shell 56.

Figure 15:
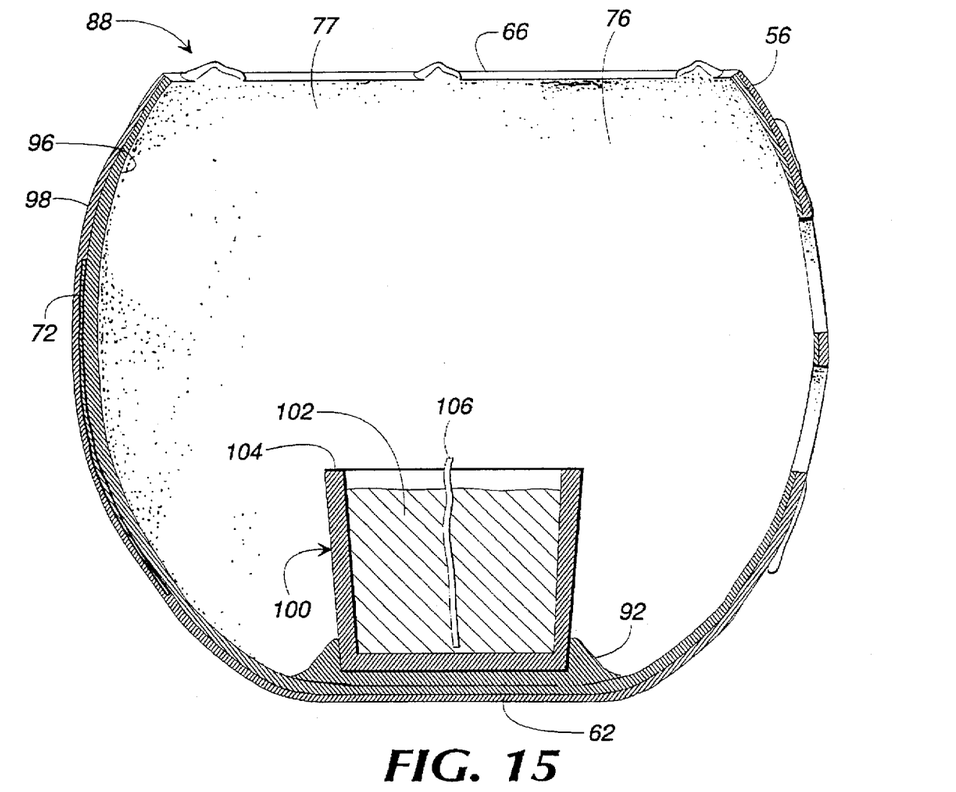
FIG. 15 is a side cross-sectional view of a glowing orb candle in accordance with an alternate embodiment of the present invention which includes a votive candle.
Figure 16:
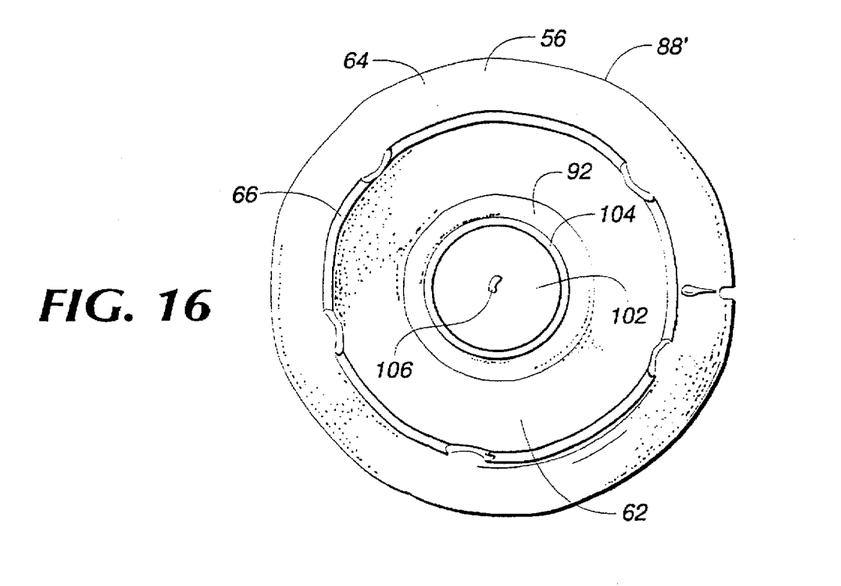
FIG. 16 is a top plan view of the glowing orb candle of FIG. 15.

The present invention also includes many alternate embodiments, one of which is illustrated in FIGS. 15 and 16 which show side cross-sectional and top plan views, respectively, of a glowing orb candle 88' in accordance with an alternate embodiment of the present invention. While the primary shell 56 is identical to that of the preferred embodiment, a common votive 100 is shown connected through the inner cup 92 to the shell bottom wall 62. The votive 100 includes a votive candle 102 surrounded by a glass votive holder 104 and containing a votive wick 106. The glowing orb candle 88' functions similarly to the glowing orb candle 88 of the preferred embodiment while providing additional separation in the form of the glass votive holder 104 between the votive candle 102 and the primary shell 56.

Figure 17:
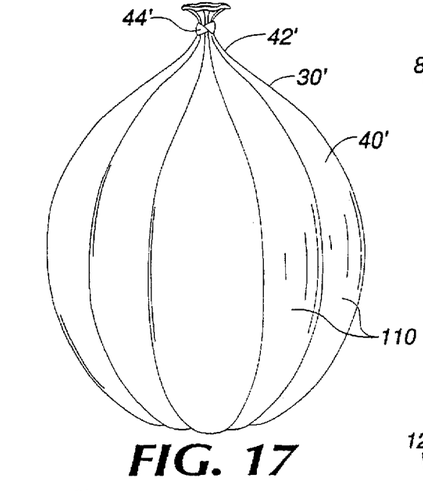
FIG. 17 is a side elevational view of another distensible mold in accordance with another alternate embodiment of the present invention.
Figure 18:
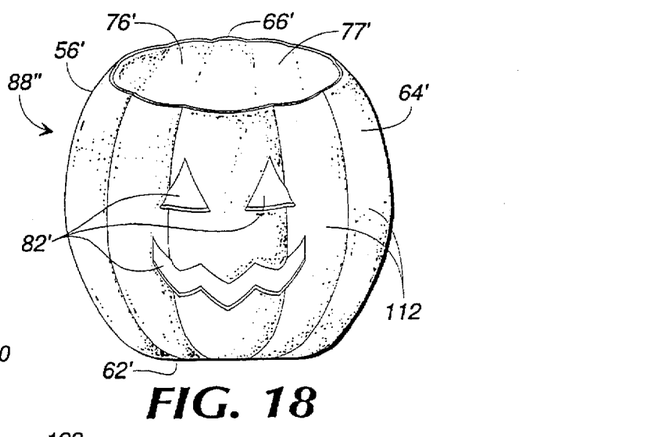
FIG. 18 is a from perspective view of a glowing orb candle formed using the distensible mold of FIG. 17.
Figure 19:
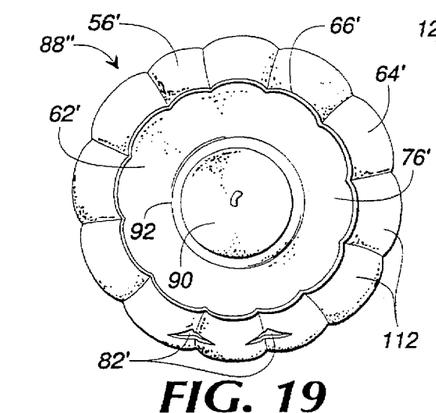
FIG. 19 is a top plan view of the glowing orb candle of FIG. 18.

Another alternate embodiment of the present invention is represented by FIGS. 17–19. FIG. 17 shows a side elevational view of an alternate distensible mold 30', whereas FIGS. 18 and 19 show front perspective and top plan views, respectively, of a glowing orb candle 88'' constructed from the distensible mold 30' of FIG. 17. Referring now to FIG. 17, the distensible mold 30' is shown in an expanded condition with a neck knot 44' tied in a mold neck 42'. The mold exterior 40' is shown including a number of mold ridges 110. With reference also to FIGS. 18 and 19, an alternate primary shell 56' is formed through steps similar to those discussed above, such as submerging the distensible mold 30' partially in molding material 52 (FIG. 2) and allowing the primary shell 56' to solidify on a flat surface 60 (FIG. 4). Because of the mold ridges 110, shell ridges 112 are formed into the primary shell 56'. Apertures 82' are then cut into the primary shell 56' while removing the excess molding material 52 rather than allowing it to form droppings below the apertures 82'. In a manner similar to the preferred embodiment, an inner member 90 is placed within an inner cavity 76' and mounted upon a shell bottom wall 62' through an inner cup 92.

Figure 20:
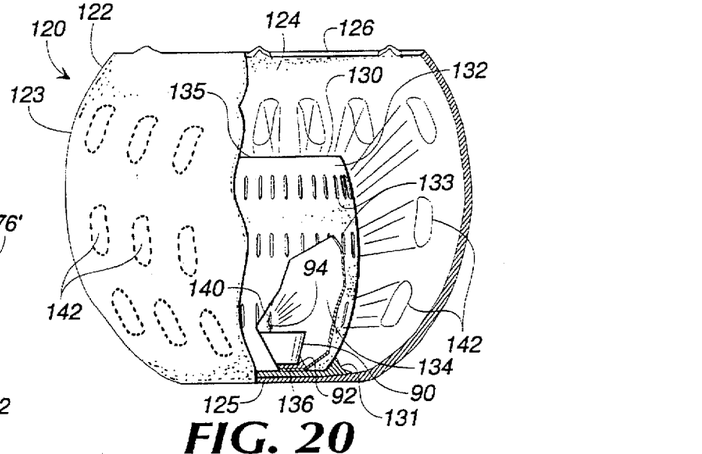
FIG. 20 is a side cross-sectional cut-away view of a glowing orb candle in accordance with another alternate embodiment of the present invention.
Figure 21:
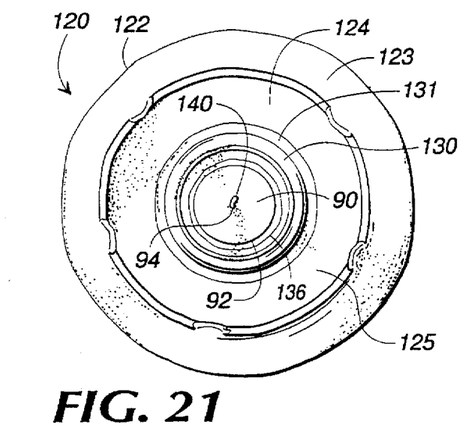
FIG. 21 is a top plan view of the glowing orb candle of FIG. 20.

Refer now to FIGS. 20 and 21 which show a cross-sectional cut-away view and a top plan view, respectively, of yet another alternate embodiment of the present invention. A glowing shadow candle 120 is shown including an external shell 122, an internal shell 130, and a lighted inner member 90. The external shell 122 includes an external bottom wall 125 and an external side wall 123 defining an external cavity 124 and an external upper aperture 126 without small apertures or an embedded object. The internal shell 130 is located within the external cavity 124 mounted upon the external bottom wall 125 through an internal shell cup 131 formed in a manner similar to that of the inner cup 92. The internal shell 130 includes an internal shell wall 132 and an internal bottom wall 136 defining an internal cavity 134 accessible through an internal upper aperture 135. A number of internal apertures 133 are shown extending through the internal shell wall 132. The inner member 90 is shown mounted to the internal bottom wall 136 through an inner cup 92 and shown including a wick 94 which is burning with a flame 140. As light shines from the flame 140, both the internal shell 130 and external shell 122 are constructed, sized and oriented to glow without melting. Furthermore, as light is emitted through the internal apertures 133, light projections 142 which are visible from outside the glowing shadow candle 120 appear on the external side wall 123. As the flame 140 flickers, the light projections bounce about to produce a very pleasing effect.

Figure 22:
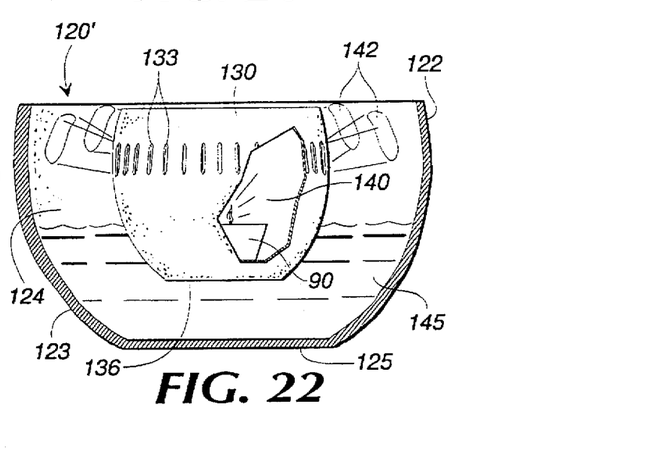
FIG. 22 is a side cross-sectional cut-away view of a glowing orb candle in accordance with yet another alternate embodiment of the present invention.

Referring now to FIG. 22, a glowing shadow candle 120' in accordance with another alternate embodiment of the present invention is shown in a cross-sectional cut-away view. An alternately-shaped external shell 122' is shown defining an external cavity 124' inside which is located an alternately-shaped internal shell 130' floating in a volume of flotation liquid 145, an acceptable example being ordinary water. A lighted inner member 90 with a flame 140 causes light projections to appear on an external side wall 123'. Because the internal shell 130' is floating within the external shell 123', the internal shell 130' is able to move about with respect to the external shell 123'. Such movement causes the light projections 142 to move and bounce about even more than that caused by flickering of the flame 140.

While a variety of alternate embodiments of the present invention have already been discussed with reference to the drawings, the present invention includes other alternate embodiments described below which would be readily understood by one reasonably skilled in the art upon review of the foregoing drawings and description. It should be understood that each of the embodiments disclosed herein, including the preferred embodiment, includes features and characteristics which are considered independently inventive. Accordingly, the disclosure of variations and alterations expressed in alternate embodiments is intended only to reflect on the breadth of the scope of the present invention without suggesting that any of the specific features and characteristics of the preferred embodiment are more obvious or less important.

As is evident from the description of two differently-shaped distensible molds 30 (FIG. 1) and 30' (FIG. 17), the present invention contemplates the use of a variety of differently shaped and differently constructed distensible molds to produce a variety of differently-shaped shells such as those in the shape of other types of fruit, animals, cartoon characters, etc. As is also evident from the use of shells with and without apertures and/or embedded foreign objects, the present invention includes shells, and the methods for producing them, having no apertures or embedded foreign objects, having one or more apertures alone, having one or more embedded foreign objects alone, and having embedded foreign objects and apertures.

Also, in mass production environments, it would be desirable to utilize reusable distensible molds, thus, rather than using neck knots, other methods such as clamping or maintaining fluid pressure into the molds are contemplated for maintaining the expansion of the distensible molds. Also included within the scope of the present invention are other methods of removing a distensible mold from a formed shell which include removing the distensible mold and distensing fluid from the shell without removing the distensing fluid from the distensible mold. Such methods include rotating the distensible mold with the attached shell and supporting the shell while the distensible mold is allowed to deform and fall (or be pulled) out of the shell under the weight of the distensing fluid. It has been found that a shell with a lower, wider top edge is more conducive to allowing the distensible mold to simply fall out of the shell. The distensing liquid would need to be allowed to cool before reuse if the integrity of the distensible mold is in question or more rapid application of molding material is desirable since cooler distensing fluid serves as a more effective heat sink. According to still other methods of the present invention, molds may be completely submerged within the molding material so that a portion of the molding material is eventually removed to allow for removal of the mold. In addition, molds with attached newly formed shells may be hung rather than placed on flat surfaces to maintain round shell bottom walls.

Besides liquids, the use of other fluids is contemplated to expand the distensible mold. In addition, besides the example of beeswax given for molding material 52, other types of molding material may be used to construct shells, some having no relationship to candles, including, but not limited to, ordinary wax, plastic, and food products such as candy or chocolate. Smaller shells may also be used as containers for personal products, etc. Also, the temperature of the molding material 52 can be varied, as well as mixed with various particulates, to vary the texture and appearance of the shell. To achieve a smooth finish, the temperature of the molten material 52 should be maintained at least above a level where no coating has formed on the top of the molten material 52. In the example of beeswax, as the temperature reaches 140° F., a coating begins to form on top of the beeswax in the reservoir 50 which results in a grainy appearance, whereas temperatures approaching 220° F. cause any trash or water found at the bottom of the reservoir 50 to circulate within the beeswax to change the appearance of the shell 56. The temperature can also be varied to alter the thickness of the layers of the shell 56 with hotter temperatures producing thinner layers. While the heat sink caused by the presence of the distending fluid 32 within the distensible mold 30 reduces the tendency of the shell 56 to lose previously applied layers when exposed to hot molten material 52, the temperature should, to add layers, be kept below the level where previous layers begin to be lost unless one is desiring to begin exposing a previously embedded object.

Regarding the submerging step shown in FIG. 3, rather than pulling the distensible mold 30 out of the molding material 52 in one continuous motion, the distensible mold 30 can be withdrawn in stages to form parallel lateral lines encircling the primary shell 56 to give the primary shell 56 the appearance of having been spun on a pottery wheel. In addition, rather than maintain the distensible mold 30 in a vertical position within the molding material 52, the distensible mold 30 can be tilted in various directions to create a more flared shell top edge 66 (FIG. 4). The submerging step may also be repeated multiple times at different heights using variously colored molding materials 52 to produce multi-colored shells. Of course, the use and non-use of alternately shaped apertures 82 and/or foreign objects 72 is also contemplated. Also, as is evident from FIG. 22, the shells are designed to float so that it is contemplated to use the glowing orb candles 88 floating in bathtubs, swimming pools, etc.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below.

We claim:

1. A candle comprising:

a wax outer shell constructed of a first material defining an outer shell inner cavity, an outer shell upper aperture providing access to said outer shell inner cavity, an outer shell inner surface, and an outer shell outer surface;

a wax inner shell constructed of said first material defining an inner shell inner cavity, an inner shell upper aperture providing access to said inner shell inner cavity, an inner shell inner surface, and an inner shell outer surface, said inner shell being located at least substantially within said outer shell inner cavity with said inner shell outer surface contacting substantially all of said outer shell inner surface;

a plant object interposed between said inner shell outer surface and said outer shell inner surface; and an inner candle member located within said inner shell cavity and said outer shell inner cavity, including a burnable wick embedded within said inner candle member.

2. The candle of claim 1, wherein said wax outer shell and said wax inner shell define continuous spherical walls in an orb shape.

3. The candle of claim 1, wherein said object is adhesively affixed to said inner shell outer surface.

4. The candle of claim 1, wherein said wax inner shell is located entirely within said wax outer shell.

5. The candle of claim 1, wherein said wax outer shell and said wax inner shell are so constructed and said inner candle member is so located within said inner shell inner cavity and outer shell inner cavity that said wax outer shell glows without melting during burning of said wick so that said wax outer shell is completely reusable.

6. The candle of claim 1, wherein said wax outer shell includes a plurality of shadow-casting wax bulges and a plurality of light-emitting apertures.

7. The candle of claim 1, wherein said wax outer shell includes, at least, a continuous flat bottom wall and a continuous spherical side wall extending upward from said continuous flat bottom wall to surround said outer shell inner cavity and define said outer shell upper aperture, wherein said wax inner shell includes, at least, a continuous flat bottom wall and a continuous spherical side wall extending upward from said continuous flat bottom wall to surround said inner shell inner cavity and define said inner shell upper aperture, and wherein said inner candle member is located adjacent said continuous flat bottom wall of said wax inner shell.

8. The candle of claim 7, further comprising a glass container supporting said inner candle member within said inner shell inner cavity.

9. The candle of claim 1, wherein said wax inner shell includes a flat bottom and a side wall extending upward from said flat bottom, and wherein a substantial space is defined between said inner candle member and said side wall.

10. The candle of claim 1, wherein said inner candle member is readily removable from said wax inner shell and said wax outer shell.

11. The candle of claim 1, wherein said burnable wick extends only through said inner candle member.

12. The candle of claim 1, wherein said inner candle member is removably mounted upon said flat bottom wall of said wax inner shell through an inner cup.

13. A candle comprising:

a meltable outer shell including a flat bottom and a side wall extending up from said flat bottom and defining an inner cavity and an upper aperture providing access to said inner cavity; and a burnable inner member removably located within said inner cavity of said wax outer shell below said upper aperture, said burnable inner member including a wax core and a wick extending only through said wax core, wherein said meltable outer shell is so constructed and said burnable inner member is so located within said inner cavity and continuously separated from said side wall of said meltable outer shell by a substantial space that said burnable inner member burns and releases heat through said upper aperture without melting said outer shell.

14. The candle of claim 13, wherein said outer shell defines a plurality of light-emitting passages.

15. The candle of claim 13, wherein said outer shell includes, at least one foreign object embedded within said side wall of said outer shell.

16. The candle of claim 13, further comprising a glass container supporting said inner member within said inner cavity.

17. The candle of claim 13, further comprising an inner shell which is smaller than said outer shell and is located at least partially within said inner cavity of said outer shell, wherein said inner member is located within said inner shell.

18. A candle comprising:

a wax outer shell having a substantially uniform thickness and constructed of a first material defining an outer shell inner cavity, an outer shell upper aperture providing access to said outer shell inner cavity, a continuous flat bottom wall and a continuous spherical side wall extending upward from said continuous flat bottom wall to surround said outer shell inner cavity and define said outer shell upper aperture, an outer shell inner surface, and an outer shell outer surface;

a wax inner shell having a substantially uniform thickness and constructed of said first material defining an inner shell inner cavity, an inner shell upper aperture providing access to said inner shell inner cavity, a continuous flat bottom wall and a continuous spherical side wall extending upward from said continuous flat bottom wall to surround said inner shell inner cavity and define said inner shell upper aperture, an inner shell inner surface, and an inner shell outer surface, said inner shell being located at least substantially within said outer shell inner cavity with said inner shell outer surface contacting substantially all of said outer shell inner surface;

a plant object adhesively affixed to said inner shell outer surface and interposed between said inner shell outer surface and said outer shell inner surface; and a burnable inner member removably located within said inner shell inner cavity below said inner shell upper aperture, said burnable inner member including a wax core and a wick extending only through said wax core, wherein said outer shell and said inner shell are so constructed and said burnable inner member is so located within said inner shell inner cavity and continuously separated from said continuous spherical side wall of said inner shell by a substantial space that said burnable inner member burns and releases heat through said inner shell upper aperture without melting said inner shell or said outer shell.

19. The candle of claim 18, wherein said inner candle member is removably mounted upon said continuous flat bottom wall of said wax inner shell through an inner cup.

* * * * *